UNITED STATES PATENT OFFICE.

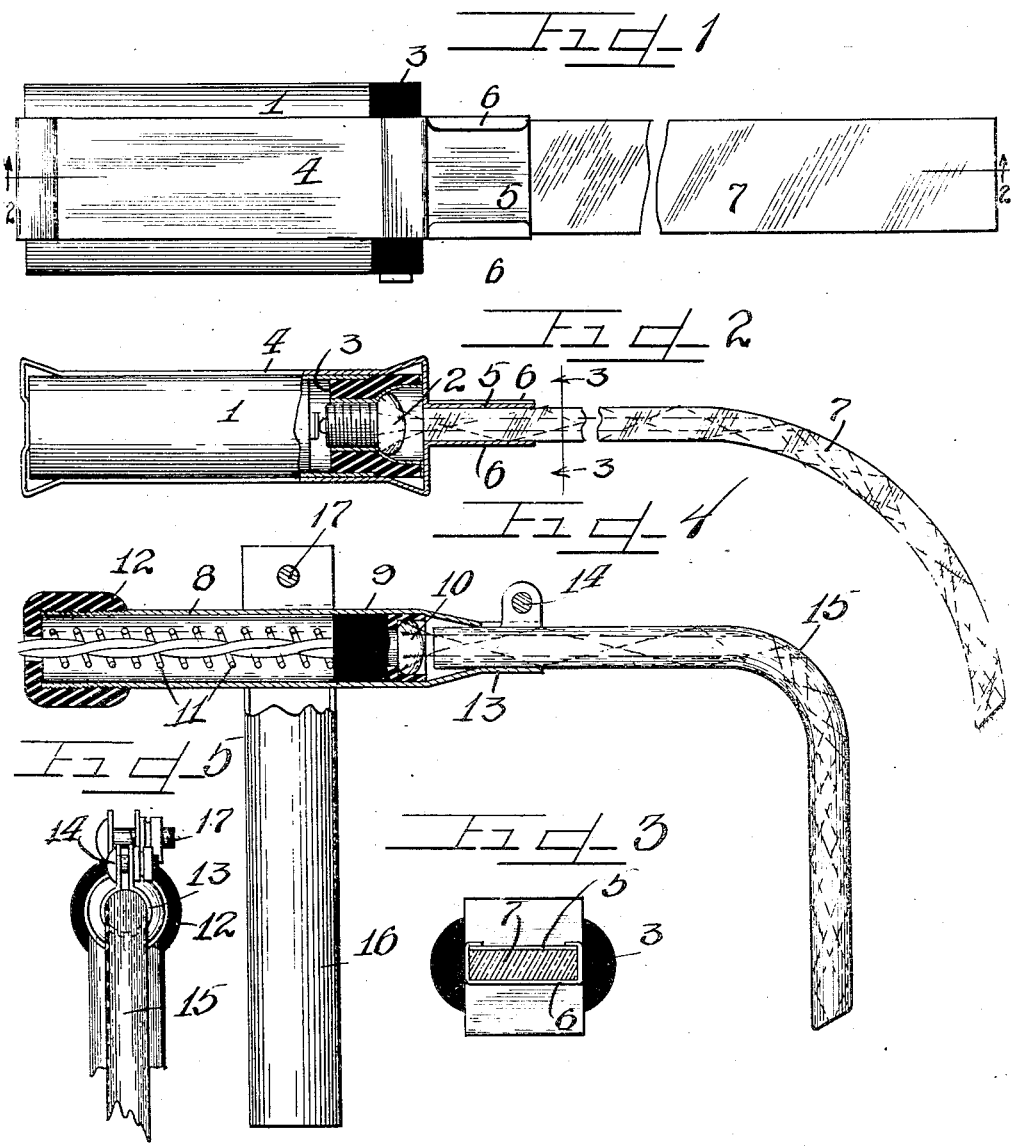

ISAAC J. SMIT, OF CHICAGO, ILLINOIS.

ILLUMINATED TRANSPARENT RETRACTOR.

1,246,338.

Specification of Letters Patent.

Patented Nov. 13, 1917.

Application filed August 21, 1916. Serial No. 116,176.

*To all whom it may concern:*

Be it known that I, ISAAC J. SMIT, a citizen of the United States, and a resident of the city of Chicago, in the county of Cook and State of Illinois, have invented certain new and useful Improvements in Illuminated Transparent Retractors; and I do hereby declare that the following is a full, clear, and exact description of the same, reference being had to the accompanying drawings, and to the numerals of reference marked thereon, which form a part of this specification.

This invention relates to an illuminated transparent retractor adapted to supplant the usual metal or other opaque material retractor or depressor instruments. The present invention possesses many advantageous features over the former types of this class of instruments heretofore used for the reason that, by this invention, an illumination of an object or area at the outer end of the retractor is made possible, and as well, a clear vision may be had directly through the transparent glass retractor itself, through which the light rays are conducted invisible to the eye. The rays of light introduced into the glass member from any suitable source of illumination are invisible to the eye through the side walls of the glass element owing to the fact that said rays are confined and transmitted through the element due to the phenomenon of internal reflection, but upon striking the outer end surface of the glass element, are permitted to pass therethrough to illuminate the area or object adjacent thereto.

It is an object therefore of this invention to construct an instrument adapted to conduct light therethrough and yet permit ready vision to be had through the side walls thereof for examination of objects on each side of the instrument through which the light is conducted with the rays of light conducted within said elements invisible to the eye so as to not affect the vision had therethrough.

It is also an object of this invention to construct a surgical or dental instrument wherein a transparent light conducting medium is associated with a source of light to conduct the light by internal reflection, and to project the light at the outer end therefrom, causing the light, in its passage, to traverse a tortuous path according to the shape of the light conducting element.

It is furthermore an object of this invention to construct a transparent self-illuminated retractor for use in dental and surgical operations wherein vision may be had directly through the retractor without the rays of light passing therethrough being visible to the eye except at the point of emission therefrom at the end of the retractor.

It is finally an object of this invention to construct a transparent light conducting retractor with a source of light concealed within the handle of the retractor whereby the rays of light are caused to traverse through a transparent retractor by internal reflection for projection from the outer end thereof.

The invention (in a preferred form) is illustrated in the drawings and hereinafter more fully described.

On the drawings:

Figure 1, is a top plan view of a device embodying the principles of my invention.

Fig. 2, is a fragmentary section on line 2—2, of Fig. 1, with parts shown in elevation.

Fig. 3, is a sectional detail taken on line 3—3 of Fig. 2.

Fig. 4, is a view similar to Fig. 2, of a modified form of retractor.

Fig. 5, is a fragmentary end view thereof.

As shown in the drawings:

Referring to Figs. 1, 2 and 3, a flashlight casing is denoted as a whole by the reference numeral 1, and contains an electric bulb 2, therein, seated within a suitable insulating plug closure 3, provided at the forward end of the flashlight casing. Secured longitudinally around the casing 1, is a metal strap 4, which, at its forward end beyond the insulating closure 3, is bent inwardly to afford resilient gripping members 5 and 6, respectively.

As clearly shown in Figs. 1 and 2, the gripping jaw or clamping member 6, is turned over along its side edges around the edges of the jaw member 5, so as to limit the movement of said jaw members apart from one another. Held tightly but releasably secured between the respective jaw members 5 and 6, is a curved strip of glass 7, of rectangular cross-section which acts to receive the rays of light from the electric bulb 2, and to transmit the same therethrough by internal reflection to the extreme end surface of said glass without permitting emission of any of the rays through the highly polished smooth side surfaces or "surfaces of separation" of the glass with respect to the air medium surrounding the same.

In the modified form of construction illustrated in Figs. 4 and 5, I have shown a cylindrical casing 8, within which an insulating plug 9, is mounted, carrying an electric bulb 10, which is impelled toward the forward end of said casing by a compression spring 11, mounted within the casing and seated upon an insulating plug closure 12, threaded on the rear end of the casing. The forward end of said casing 8, is reduced in diameter to afford a tubular clamping extension 13, with a clamping bolt and nut 14, engaged through the extensions thereon to clamp a cylindrical bent or curved glass light transmitting retractor element 15, therein. As shown the outer end surface of the glass light transmitting element 15, is beveled or angled. This is to slightly refract the rays to one side, as in some instances of use of the instrument this may be desirable.

Attached at right angles upon the casing 8, is a handle 16, secured thereon by a clamping screw and bolt 17, whereby manipulation of the instrument is facilitated.

The operation is as follows:

The light introduced into either of the transparent light transmitting or conducting elements 7 or 15, shown, is caused to pass therethrough, and any of the rays striking any of the highly polished smooth exterior surfaces of said glass element are internally reflected within the element, and continue their passage to the outer end thereof and are there emitted at the end surface. The phenomenon of internal reflection is due to the fact that said light transmitting elements are so constructed and the bends are of sufficient radius as to insure the incident rays of light striking the highly polished surfaces at an angle considerably greater than the critical angle for the media glass and air, and emission of said rays is only permitted as stated, at the outer end surface of the light transmitting element. By changing the angle or curvature of the end surface of the light transmitting element, it is obvious different illumination effects may be obtained.

I am aware that the details of construction may be varied through a wide range without departing from the principles of this invention, and I therefore do not purpose limiting the patent granted otherwise than necessitated by the prior art.

I claim as my invention:

1. A device of the class described, comprising a casing, clamping jaws extending from one end thereof, an insulating plug in said casing limited in its movement in one direction by said clamping jaws, an electric lamp in said plug, and a transparent light conducting element mounted detachably within said clamping jaws to receive the light thereinto from said source of light so as to transmit the same therethrough by internal reflection for emission at the outer end of said element.

2. A device of the class described, comprising a casing, a strap member secured therearound, resilient clamping jaws forming extensions of said strap member, a source of light within said casing, and a transparent light conducting element mounted detachably within said clamping jaws to receive the light thereinto from said source of light so as to transmit the same therethrough by internal reflection for emission at the outer end of said element.

3. A device of the class described, comprising a casing, a strap member secured therearound, resilient clamping jaws forming extensions of said strap member, an insulating plug in said casing limited in its movement in one direction by said clamping jaws, an electric lamp in said plug, and a transparent light conducting element mounted detachably within said clamping jaws to receive the light thereinto from said source of light so as to transmit the same therethrough by internal reflection for emission at the outer end of said element.

4. A device of the class described, comprising a casing, a strap member secured therearound, resilient clamping jaws forming extensions of said strap member, one of said jaws being turned over at its side edges around the edge of the other jaw, an insulating plug in said casing limited in its movement in one direction by said clamping jaws, an electric lamp in said plug, and a transparent light conducting element mounted detachably within said clamping jaws to receive the light thereinto from said source of light so as to transmit the same therethrough by internal reflection for emission at the outer end of said element.

In testimony whereof I have hereunto subscribed my name in the presence of two subscribing witnesses.

ISAAC J. SMIT.

Witnesses:
CHARLES W. HILLS, Jr.,
EARL M. HARDINE.